United States Patent
Christensen

(10) Patent No.: US 6,808,298 B2
(45) Date of Patent: Oct. 26, 2004

(54) LIGHTING SYSTEM

(76) Inventor: Todd Regan Christensen, 54 Clayton Park Dr., Glen Mills, PA (US) 19342

( * ) Notice: Subject to any disclaimer, the term of this patent is extended or adjusted under 35 U.S.C. 154(b) by 0 days.

(21) Appl. No.: 10/368,605

(22) Filed: Feb. 20, 2003

(65) Prior Publication Data

US 2003/0133308 A1 Jul. 17, 2003

Related U.S. Application Data

(63) Continuation of application No. PCT/US01/22611, filed on Aug. 21, 2001.

(30) Foreign Application Priority Data

Aug. 21, 2000 (NZ) .................................................. 506499

(51) Int. Cl.⁷ ................................................. B62J 6/00
(52) U.S. Cl. ....................... 362/473; 362/523; 362/475; 340/468
(58) Field of Search ................................ 362/473, 475, 362/476, 543, 523, 285, 418; 340/475, 432, 471, 473

(56) References Cited

U.S. PATENT DOCUMENTS

| | | | |
|---|---|---|---|
| 4,051,361 A | * | 9/1977 | Lichon et al. .............. 362/211 |
| 4,686,656 A | | 8/1987 | Morishima |
| 5,355,746 A | | 10/1994 | Lin |
| 5,418,696 A | * | 5/1995 | Izzo, Sr. ..................... 362/473 |
| 5,434,758 A | | 7/1995 | Zeidler |
| 5,580,152 A | * | 12/1996 | Carter ........................ 362/474 |
| 5,617,303 A | | 4/1997 | Izzo, Sr. |
| 5,689,232 A | * | 11/1997 | O'Shaughnessy et al. .. 340/468 |
| 5,727,864 A | | 3/1998 | Stelling et al. |
| 5,820,254 A | | 10/1998 | Duenas |
| 5,933,076 A | | 8/1999 | Babb |
| 6,049,271 A | | 4/2000 | Chu |
| 6,053,626 A | | 4/2000 | Zagrodnik et al. |
| 6,089,738 A | | 7/2000 | Ebara |
| 6,424,255 B1 | * | 7/2002 | Shanahan ................... 340/457 |

* cited by examiner

Primary Examiner—Thomas M. Sember
(74) Attorney, Agent, or Firm—Jacobson Holman PLLC

(57) ABSTRACT

A headlight system including a mounting device whereby the headlight system can be mounted on a vehicle, and a pair of spaced apart headlights carried by the mounting device. The mounting device includes an adjustment device whereby the distance between the headlights carried by the mounting device may be varied. The adjustment device includes a telescopic mounting device.

8 Claims, 1 Drawing Sheet

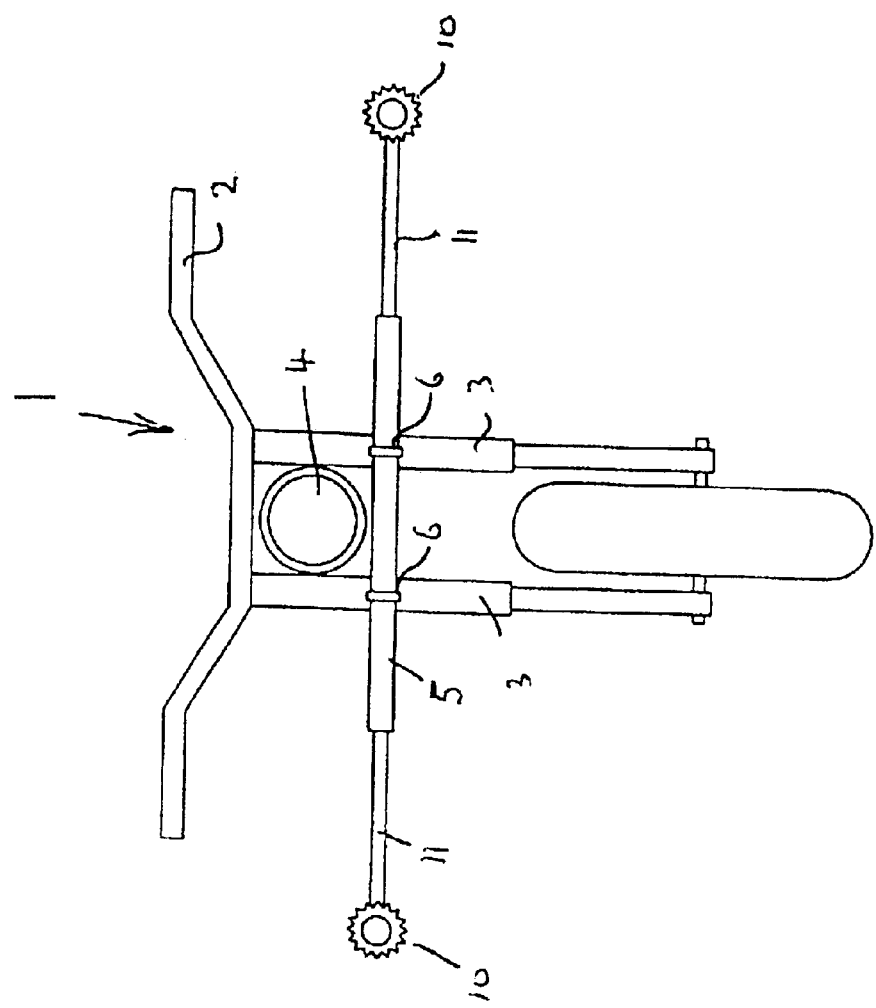

LIGHTING SYSTEM

This is a continuation of PCT/US01/22611 filed Aug. 21, 2001 and published in English.

FIELD OF THE INVENTION

This invention relates to a headlight system and has been devised particularly, though not necessarily solely for use with small or narrow vehicles. An example of such a vehicle is a motorcycle.

BACKGROUND OF THE INVENTION

The HURT Report which is a well known report of a study of thousands of motorcycle accidents in Southern California, found that the primary cause of motorcycle accidents was non-conspicuity of the motorcycle to drivers of other vehicles. It is my belief, based on personal experience, that motorcycles, even with their headlight on, do not create an automatically perceived threat in the minds of drivers of four wheeled vehicles. Although the driver may "see" the motorcycle, the driver will still proceed into the path of the motorcycle. This may have something to do with the threat-filtering mechanism built into the reticular formation of the human brain. Further study may identify the psychological and physiological foundations for my hypothesis. However, real world observations verify that the phenomena of motorists not "seeing" patently visible motorcycles is correct.

SUMMARY OF THE INVENTION

It is an object of the present invention to provide a headlight system and/or a vehicle which will obviate or minimize the foregoing problem in a simple yet effective manner or which will at least provide the public with a useful choice.

Accordingly in one aspect the invention may broadly be said to consist in a headlight system comprising a mounting device whereby the headlight system can be mounted on a vehicle, and a pair of spaced apart headlights carried by the mounting device.

The mounting device includes an adjustment device whereby the distance between the headlights carried by the mounting device may be varied.

The adjustment device includes a telescopic mounting device.

Preferably the headlight system includes switch means whereby, in use, when the spaced apart headlights are "on" any existing headlight is "off".

Preferably the distance apart of the headlights is expandable to at least one meter.

In a further aspect the invention may broadly be said to consist in a vehicle carrying a headlight system according to any one of the proceeding paragraphs.

Preferably the vehicle comprises a two wheeled vehicle.

Preferably the spaced apart headlights are positioned one on each side of the existing headlights of the vehicle.

Preferably the mounting device is carried on the front wheel forks of a two wheeled vehicle.

This invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are deemed to be incorporated herein as if individually set forth.

BRIEF DESCRIPTION OF THE DRAWINGS

One preferred form of the invention will now be described with reference to the accompanying drawing which is a diagrammatic front elevation of a headlight system and a vehicle according to one preferred form of the invention.

DETAILED DESCRIPTION OF THE PREFERRED EMBODIMENTS

In the preferred form of the invention a headlight system is provided as follows.

The vehicle 1 is shown as a two wheeled vehicle in particular a motorcycle having handle bars 2 and forks 3, with a single central headlight 4. It will be apparent that other vehicles could be used such as, for example, three wheel and four wheel farm bikes or any other narrow vehicle. The headlight system comprises a mounting device which, in the embodiment of the invention shown in the figure, comprises a rod or tube 5 which will be further described hereinafter and a pair of clips, straps or other connecting devices 6. The mounting device enables the headlight system to be mounted onto the vehicle and in the embodiment shown, the lights are mounted onto the front forks 3 of the motorcycle 1. In other embodiments a different mounting position may need to be selected.

The mounting device carries a pair of spaced apart headlights 10, which are preferably dual low beam headlights, which are small and aerodynamic, but are capable of producing the same brightness are larger headlights. The headlights are spaced apart a distance not less than the distance between the headlights of a small car which is about 1 meter. A distance apart of about 1.2 meters is satisfactory. This distance apart cannot be too great or normal use of the motorcycle will be interfered with.

The headlights 10 are desirably retractable, preferably to a distance apart which is less than the handlebar width of the vehicle. This enables the headlights to be withdrawn, for example, during daylight use, or for maneuvers such as lane splitting in heavy traffic, maneuvering in tight spaces and when the lean angles require greater ground clearance such as tight cornering with a sports motorcycle. In the embodiments shown, the headlights 10 are each mounted on a rod or tube 11 which is telescopic within the larger tube 5. These could be simply a relatively tight fit so that extension and retraction can be performed manually or other embodiments such as using hydraulic or pneumatic piston assemblies could be used.

Other retraction systems such as providing an elbow joint in each rod so that the headlights 10 can be swung inwardly may also be used, or indeed any suitable retraction or expansion system.

The power supply is desirably wired so as to provide a switch (not shown) which will enable the central headlight 4 to be switched off when the dual headlights 10 are switched on.

The use of the invention is as follows:

In use, with the dual headlights 10 expanded and on, and the central headlight 4 off, the motorcycle presents the appearance of a four wheeled vehicle when seen by another driver approaching the headlights 10. It is believed that this will give a substantial safety factor over, in particular, two wheeled vehicles as currently driven. It is for this reason that sufficient distance apart of the headlights is required, otherwise the approaching motorist may "see" a vehicle which is, in the mind of the user, a large vehicle some distance away, rather than a close vehicle.

Thus it can be seen that at least in the preferred form of the invention, a headlight system and/or a vehicle are provided which has the advantage that, in particular a narrow vehicle such as a motorcycle, can be caused to appear to be a somewhat wider or larger four wheeled vehicle to approaching motorists. It is believed that this design will increase the chances of the motorcycle being seen and avoided by drivers of, in particular, four wheeled vehicles.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A headlight system for a motorcycle comprising:

a mounting device secured relative to a central headlight assembly of a motorcycle for mounting the system on a front end of the motorcycle, a pair of spaced apart headlights carried by the mounting device with each one of the pair of headlights being located on an opposite side of the motorcycle, and an adjustment device for varying a distance between the headlights carried by the mounting device at the front end of the motorcycle, wherein, in use, the pair of spaced apart headlights provide the appearance of a four-wheeled vehicle when seen by another driver.

2. The headlight system according to claim 1, wherein the adjustment device includes a telescopic tube arrangement.

3. The headlight system according to claim 1, wherein the distance between the headlights is greater than one meter in an extended position of the adjustment device.

4. The headlight system according to claim 3, wherein the distance between the headlights is 1.2 meters in the extended position of the adjustment device.

5. The headlight system according to claim 1, wherein a switch on the motorcycle turns a central headlight off when the pair of spaced apart headlights are turned on.

6. The headlight system according to claim 1, wherein the distance between the headlights in a retracted position of the adjustment device is less than a width of handlebars of the motorcycle.

7. Headlight system according to claim 1, wherein the headlights are low beam headlights.

8. The headlight system according to claim 1, wherein extension and retraction of the adjustment device to vary the distance between the headlights is mechanically assisted.

\* \* \* \* \*